M. G. TILNEY.
FLOWER HOLDER.
APPLICATION FILED NOV. 12, 1919.
1,344,526.
Patented June 22, 1920.
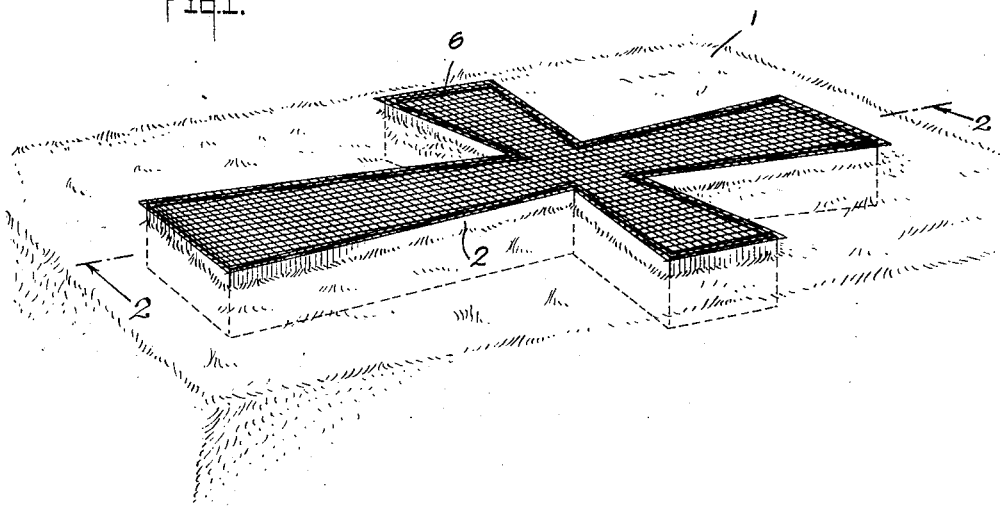
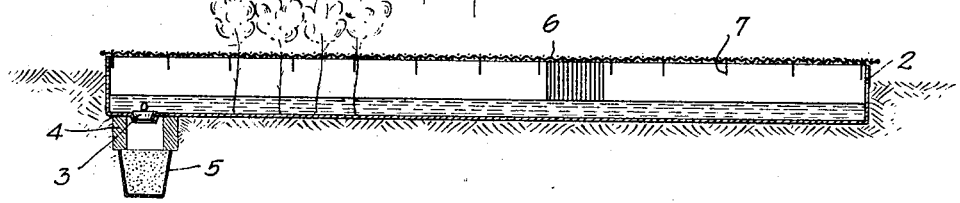
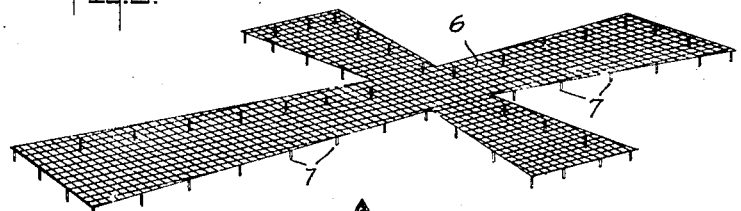
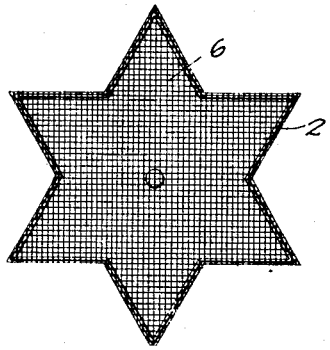
WITNESSES
INVENTOR
MARY G. TILNEY
BY
ATTORNEYS

UNITED STATES PATENT OFFICE.

MARY GARNER TILNEY, OF MOBILE, ALABAMA.

FLOWER-HOLDER.

1,344,526.  Specification of Letters Patent.  Patented June 22, 1920.

Application filed November 12, 1919. Serial No. 337,409.

*To all whom it may concern:*

Be it known that I, MARY GARNER TILNEY, a citizen of the United States, and a resident of Mobile, in the county of Mobile and State of Alabama, have invented a new and Improved Flower-Holder, of which the following is a full, clear and exact description.

It has often been noted that flowers placed upon graves have become quickly wilted due to lack of moisture and exposure to the sun.

In view of the above, it has been customary to plant flowering bushes over and around graves. This has proven more or less unsatisfactory for the reason that shrubs become larger from year to year and present an unsightly, rather than a decorative, appearance to a grave.

In an endeavor to provide cut flowers which shall remain fresh, containers have also been placed around a grave, which containers hold water; but it is pointed out that, especially during the winter months, when it would be impractical to place flowers in such containers, the containers are usually scattered around and between the graves, presenting an extremely unsightly appearance.

With a view of overcoming the above objections and providing means which shall permit of flowers being placed upon a grave without danger of their wilting due to lack of moisture, such means presenting a decorative appearance, even although no flowers are placed therein, I have constructed a flower holder which shall embody new and improved qualities.

Reference is had to the annexed sheet of drawings which illustrates practical embodiments of my invention, and in which—

Figure 1 is a perspective view of a grave with a flower holder constructed in accordance with my invention positioned thereon;

Fig. 2 is a sectional side view taken along line 2—2, Fig. 1;

Fig. 3 is a perspective view of an essential element of the flower holder; and

Fig. 4 represents a modified form of the invention.

In all these views like reference numerals designate similar parts, and the reference numeral 1 indicates a grave into the face of which there is sunk a trough 2 of any desired contour, such as, for instance, a cross. The trough 2 is adapted to contain water and is conveniently provided with a drain plug 3 under which there may be positioned supports 4, such as bricks, below which in turn there is provided a receptacle 5 containing sand, which receptacle is formed with perforations in its lower end. This construction permits, as will readily be appreciated, of a rapid draining of the trough 2 after the drain plug 3 is removed therefrom, the water slowly percolating from the receptacle 5 into the ground.

Associated with the upper face of the trough 2 is a mesh 6 which is shaped so as to conform to the contour of the trough, it being noted, however, as is illustrated in Figs. 1 and 2, that the same overlies the upper edges of the trough, the perimeter extending beyond the side walls of the trough, and is provided with downwardly-extending legs 7 set in from the perimeter and fitting within the trough, which will prevent its displacement from this position. It will now be readily understood, assuming that the plug 3 has been properly positioned in the outlet and the trough 2 filled with water, that the mesh 6 may be applied to the upper face of such trough; and it has been found that flowers inserted through the openings of and supported by such mesh, due to their being bountifully supplied with moisture and having all necessary oxygen, will live for an unusual length of time; and it will be understood that the flowers will present any desired design according to the shape of the trough. It will be appreciated that any displacement of the flowers individually or collectively will be primarily prevented by virtue of the mesh 6, any danger of movement of the latter being eliminated by reason of the legs 7 which engage the inner face of the trough 2.

Reference being had to Fig. 4, it will be readily understood that the trough illustrated in this figure represents the seven-pointed star of the Children of Israel; and it will further be understood that any desired number of designs might readily be resorted to.

Further, it is to be understood that this invention is not necessarily limited to flower holders to be applied to graves, but that the same is readily applicable in different sizes and designs to various uses.

I claim:

A flower holder for decorative purposes comprising an open top trough and a removable wire mesh top adapted to receive and hold flowers, such trough having the configuration of a predetermined design and provided with drain outlet through its bottom wall adjacent one end thereof, a rigid support for such end, and a slow-percolation mass disposed beneath said outlet and support.

MARY GARNER TILNEY.